US009507543B2

(12) United States Patent
Sutardja et al.

(10) Patent No.: US 9,507,543 B2
(45) Date of Patent: *Nov. 29, 2016

(54) METHOD AND APPARATUS FOR TRANSFERRING DATA BETWEEN A HOST AND BOTH A SOLID-STATE MEMORY AND A MAGNETIC STORAGE DEVICE

(71) Applicant: Marvell World Trade LTD., St. Michael (BB)

(72) Inventors: Sehat Sutardja, Los Altos, CA (US); Son Hong Ho, Los Altos, CA (US)

(73) Assignee: Marvell World Trade Ltd., St. Michael (BB)

( * ) Notice: Subject to any disclaimer, the term of this patent is extended or adjusted under 35 U.S.C. 154(b) by 112 days.

This patent is subject to a terminal disclaimer.

(21) Appl. No.: 14/331,725

(22) Filed: Jul. 15, 2014

(65) Prior Publication Data

US 2014/0325132 A1    Oct. 30, 2014

Related U.S. Application Data

(63) Continuation of application No. 13/098,719, filed on May 2, 2011, now Pat. No. 8,782,336.

(60) Provisional application No. 61/333,339, filed on May 11, 2010.

(51) Int. Cl.
*G06F 7/64* (2006.01)
*G06F 3/06* (2006.01)

(52) U.S. Cl.
CPC .............. *G06F 3/0685* (2013.01); *G06F 3/068* (2013.01); *G06F 3/0619* (2013.01); *G06F 3/0626* (2013.01); *G06F 3/0655* (2013.01); *G06F 3/0658* (2013.01); *G06F 3/0679* (2013.01)

(58) Field of Classification Search
CPC ........... G06F 13/1684; G06F 13/4273; G06F 3/0679; G06F 3/068; G06F 3/0685
See application file for complete search history.

(56) References Cited

U.S. PATENT DOCUMENTS 8,307,151 B1    11/2012    Caraccio et al.
8,782,336 B2    7/2014    Sutardja et al.
(Continued)

OTHER PUBLICATIONS

Chinese Office Action from related Chinese Application No. 201110126008.9 dated Feb. 27, 2015; 14 pages.
"Embedded MultiMediaCard (eMMC) Product Standard, High Capacity, including Reliable Write, Boot, Sleep Modes, Dual Data Rate, Multiple Partitions Supports, Security Enhancement, Background Operation and High Priority Interrupt (MMCA, 4.41)"; by JEDEC Solid State Technology Association; Publication No. JESD84-A441; Mar. 2010; 234 pages.

*Primary Examiner* — David X Yi
*Assistant Examiner* — Candice Rankin

(57) ABSTRACT

A hybrid circuit includes a system-in-a-package (SIP) and an integrated circuit. The SIP includes a solid-state memory, and a first control module. The first control module controls access to the solid-state memory based on a first control signal. The integrated circuit includes an embedded multimedia card (eMMC) module, a second control module, and a management module. The eMMC module is in communication with the SIP according to an eMMC standard. The first eMMC module transfers the first control signal to the first control module to access the solid-state memory. The second control module controls access to a magnetic storage device based on a second control signal. The management module generates the control signals to transfer first data between a host and the SIP via the eMMC module and transfer the first data or second data between the host and the magnetic storage device via the second control module.

20 Claims, 3 Drawing Sheets

(56) References Cited

U.S. PATENT DOCUMENTS

| | | |
|---|---|---|
| 2007/0019315 A1 | 1/2007 | Tamura et al. |
| 2008/0140921 A1 | 6/2008 | Sutardja et al. |
| 2008/0212351 A1* | 9/2008 | Park .................. G11C 5/063 365/51 |
| 2009/0193184 A1 | 7/2009 | Yu et al. |
| 2010/0185806 A1 | 7/2010 | Pruthi et al. |

* cited by examiner

METHOD AND APPARATUS FOR TRANSFERRING DATA BETWEEN A HOST AND BOTH A SOLID-STATE MEMORY AND A MAGNETIC STORAGE DEVICE

CROSS-REFERENCE TO RELATED APPLICATIONS

The present disclosure is a continuation of U.S. patent application Ser. No. 13/098,719 (now U.S. Pat. No. 8,782, 336), filed on May 2, 2011. This application claims the benefit of U.S. Provisional Application No. 61/333,339 filed on May 11, 2010. The entire disclosures of the applications referenced above are incorporated herein by reference.

FIELD

The present disclosure relates to nonvolatile memory storage systems, and more particularly to hard disk drives and solid-state drives.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A hard disk drive (HDD) may include a HDD control module (or HDD system-on-a-chip (SOC) controller) with a host interface and a hard disk assembly (HDA) interface. The HDD control module transfers data between the host interface and the HDA interface based on read and/or write command signals received from the host interface. The host interface may be connected to, for example, a computer.

The HDA includes one or more circular platters (i.e. disks), which have magnetic surfaces that are used to store data magnetically. At least one read and write head (hereinafter, "head") reads data from and writes data on the magnetic surfaces of the disks. The head is mounted on an actuator arm and is moved relative to the disks by an actuator (e.g., a voice coil motor (VCM)).

The HDD control module may include a host interface control module, a buffer management module, and a disk access control module. The host interface control module receives read/write command signals from the host and controls data transfer between the host interface and the buffer management module. The buffer management module stores the data received from the host interface in a buffer prior to being stored on the disks. The buffer management module also stores data received from the disks prior to being transmitted to the host via the host interface. The disk access control module controls data transfer between the buffer management module and the HDA.

A solid-state drive (SSD) may include a SSD control module (or SSD system-on-a-chip (SOC) controller) with a host interface and a solid-state memory (SSM) interface. The SSD control module transfers data between the host interface and SSM via the SSM interface based on read and/or write command signals received from the host interface. The host interface may be connected to, for example, a computer.

The SSM may include, for example, two or more discrete SSM chips. The SSM chips have respective interfaces that communicate with the SSM interface. The SSM interface may include hundreds of input and output (I/O) terminals.

The SSD control module includes a host interface control module, a buffer management module, and a SSM control module. The host interface control module receives read/write command signals from the host and controls data transfer between the host interface and the buffer management module. The buffer management module stores the data received from the host interface in a buffer prior to being stored in the SSM. The buffer management module also stores data received from the SSM prior to being transmitted to the host via the host interface. The SSM control module includes firmware to control access to memory cells of the SSM. The SSM control module controls, for example, read, write and erase operations of the SSM.

An HDD has associated advantages over a SSD. A HDD typically has a larger capacity than a SSD. Also, cost per megabyte (MB) of storage for a HDD is generally less than cost per MB of storage for a SDD. As a SDD includes hundreds of I/O terminals between a SSM control module and SSM, the SSM control module can be complex and expensive relative to a HDD control module. The SSM control module may include complex firmware to control data transfer to and from the SSM.

An SSD has associated advantages over a HDD. A HDD has mechanical components, such as, motors spindles, read/write heads, etc. In contrast, a SSD does not have mechanical moving parts and for this reason does not have an associated risk of a mechanical component failure. In addition, a HDD has slower seek times (time to access a target memory location) than a SSD. A HDD needs to servo a read/write head over a disk to access a target track on the disk. In contrast, a memory cell in a SSD may be directly accessed without servoing a read/write head, which decreases seek time and increases I/O operations per second (IOPs).

SUMMARY

A hybrid circuit is provided and includes a system-in-a-package and a first integrated circuit. The system-in-a-package includes a first solid-state memory and a first control module. The first control module is configured to control access to the first solid-state memory based on a first control signal. The first integrated circuit includes a first embedded multi-media card module, a second control module, and a management module. The first embedded multi-media card module is in communication with the system-in-a-package according to an embedded multi-media card standard. The first embedded multi-media card module is configured to transfer the first control signal to the first control module to access the first solid-state memory. The second control module is configured to control access to a magnetic storage device based on a second control signal. The management module is configured to (i) generate the first control signal to transfer first data between a host and the system-in-a-package via the first embedded multi-media card module, and (ii) generate the second control signal to transfer the first data or second data between the host and the magnetic storage device via the second control module, wherein the host is separate from the first integrated circuit and the system-in-a package.

In other features, a method of transferring data between a host and a hybrid circuit is provided. The hybrid circuit includes a system-in-a-package and a first integrated circuit.

The system-in-a-package includes a first solid-state memory and a first control module. The first integrated circuit includes an embedded multi-media card module, a second control module and a management module. The host is separate from the first integrated circuit and the system-in-a-package. The method includes: generating a first control signal to transfer first data between the host and the system-in-a-package via the embedded multi-media card module; generating a second control signal to transfer the first data or second data between the host and the magnetic storage device via the second control module; communicating with the system-in-a-package via the embedded multi-media card module and according to an embedded multi-media card standard including transferring the first control signal to the first control module to access the first solid-state memory; based on the first control signal, controlling access to the first solid-state memory via the first control module; and based on the second control signal, controlling access to a magnetic storage device via the second control module.

In other features, a hybrid control module is provided and includes a host interface control module configured to transfer data to and from a host interface. A first embedded multi-media card (eMMC) interface is configured to (i) connect to a second eMMC interface of a control module embedded solid-state memory (SSM) and (ii) transfer the data between the hybrid control module and the control module embedded SSM. A buffer management module is (i) in communication with the host interface control module, the first eMMC interface and a disk access control module and (ii) configured to buffer the data in volatile memory. The data is received by the buffer management module and from at least one of the host interface control module, the first eMMC interface, or the disk access control module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
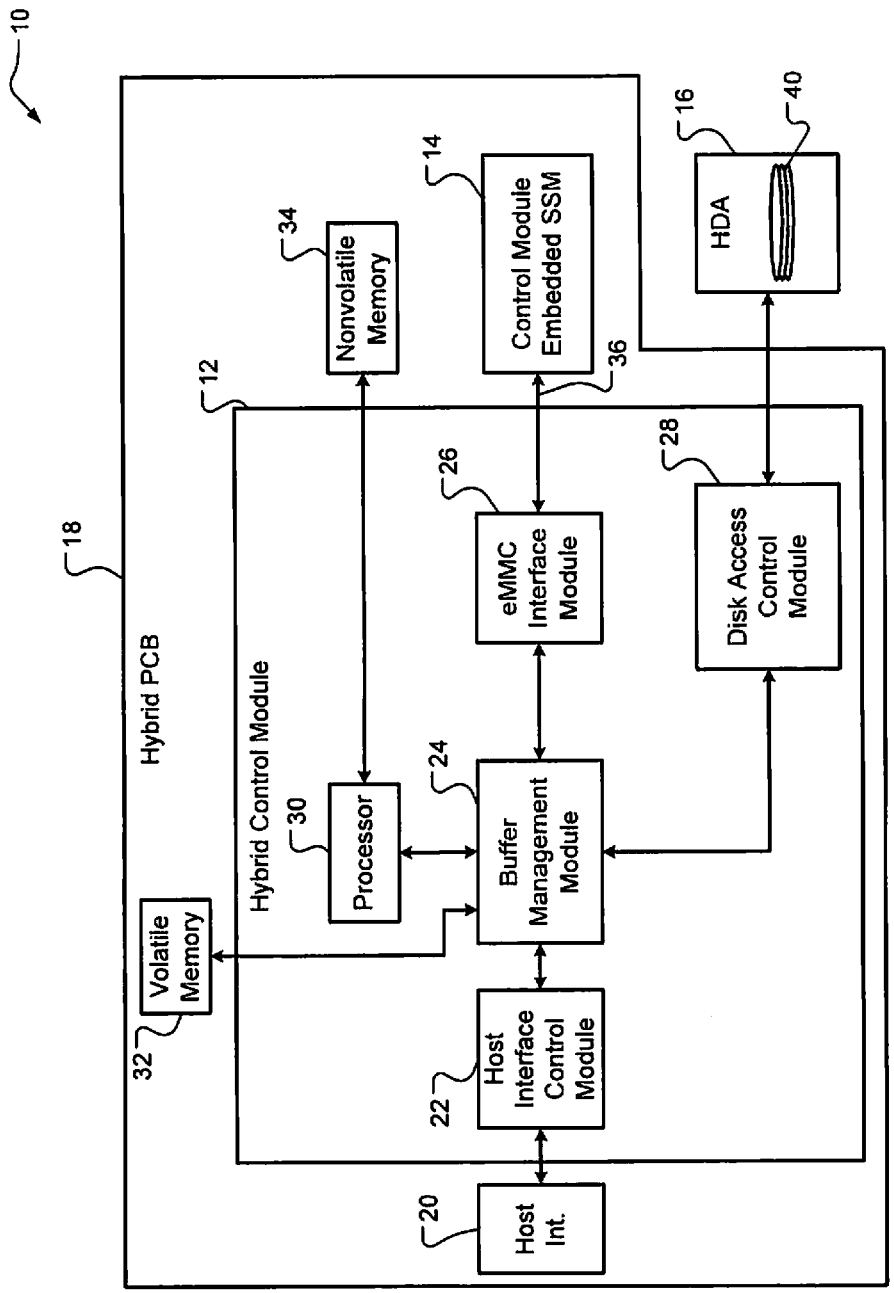
FIG. 1 is a functional block diagram of a hybrid storage system in accordance with the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In the following description, various terms are used to describe the physical relationship between components. When a first element is referred to as being "on", "engaged to", "connected to", or "coupled to" a second element, the first element may be directly on, engaged, connected, disposed, applied, or coupled to the second element, or intervening elements may be present. In contrast, when an element is referred to as being "directly on", "directly engaged to", "directly connected to", or "directly coupled to" another element, there may be no intervening elements present. Other words used to describe the relationship between elements should be interpreted in a like fashion (e.g., "between" versus "directly between", "adjacent" versus "directly adjacent", etc.).

In FIG. 1, a hybrid storage system (or hybrid storage drive) 10 is shown. The hybrid storage system 10 includes a hybrid control module 12, control module embedded solid-state memory (SSM) 14 (or control module embedded SSM 14) and a hard disk assembly (HDA) 16. The hybrid control module 12 and the control module embedded SSM 14 may be mounted on a hybrid printed circuit board (PCB) 18. The hybrid PCB 18 may be connected to and/or mounted on the HDA 16, such as on a case (not shown) of the HDA 16.

The hybrid control module 12 may be a system-on-a-chip (SOC) and transfer data between: a host (not shown) and the control module embedded SSM 14; the host and the HDA 16; and/or the control module embedded SSM 14 and the HDA 16. The hybrid control module 12 may communicate with the host via a host interface 20. The host may be a computer, a television, a display, a cellular phone, a personal data assistant, etc. The host interface 20 may be a serial advanced technology attachment (SATA) interface, a universal serial bus (USB) interface, an integrated drive electronics (IDE) interface (or parallel advanced technology attachment (ATA) interface), a fiber channel interface, etc.

The hybrid control module 12 includes a host interface control module 22, a buffer management module 24, an embedded multi-media card (eMMC) interface module 26, a disk access control module 28 and a processor 30. The host interface control module 22 may be connected between the host interface 20 and the buffer management module 24. The host interface control module 22 may convert data signals to and from data formats acceptable to the host.

The buffer management module 24 may be connected between the host interface control module 22 and the eMMC interface module 26. The buffer management module 24 may receive data to be stored in the control module embedded SSM 14 and/or the HDA 16 from the host. The buffer management module 24 may also transmit data accessed from the control module embedded SSM 14 and/or the HDA 16 to the host. The buffer management module 24 may control operation of the hybrid storage system 10 including transferring, scheduling and storing of data to and from the host interface 20, the control module embedded SSM 14, the HDA 16 and a volatile memory 32. This control may be based on commands and status information transferred between the host and the hybrid storage system 10 and/or between the hybrid control module 12 and the control module embedded SSM 14. The commands and status information may be provided to the processor 30.

Figure 2:
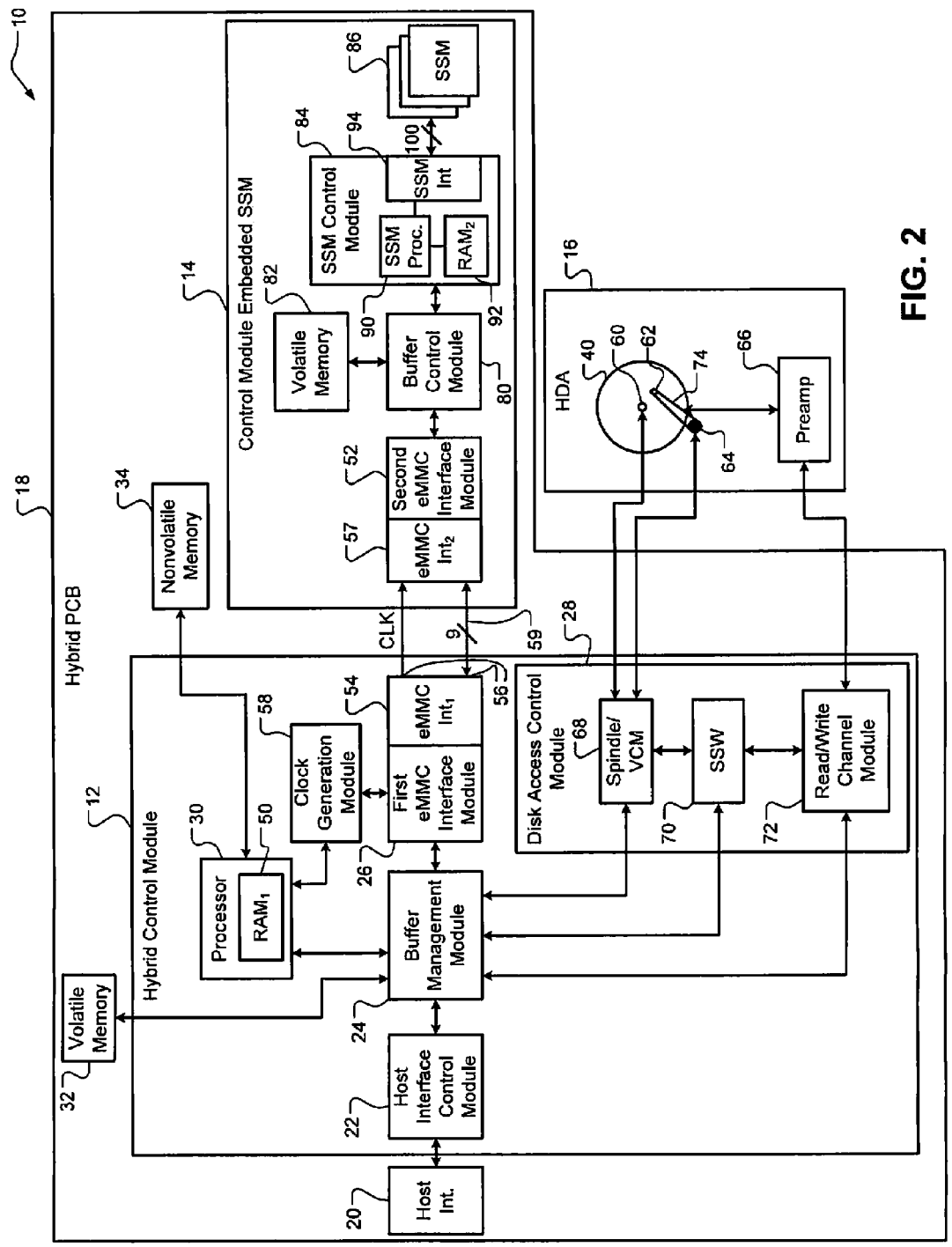
FIG. 2 is a functional block diagram the hybrid storage system of FIG. 1 illustrating an implementation of a hybrid control module and control module embedded solid-state memory.

The processor 30 may process data, including encoding, decoding, filtering, and/or formatting prior to and/or subsequent to storing the data in the control module embedded SSM 14 and/or the HDA 16. The processing may be based on the commands and/or status information. The processor 30 may have dedicated nonvolatile memory 34 on the hybrid PCB 18. The nonvolatile memory 34 may store an operating system, which is used to boot up the hybrid storage system 10. Portions and/or a copy of the operating system may be stored in SSM of the control module embedded SSM 14 (the SSM is shown in FIG. 2). The SSM may also cache data frequently accessed in the HDA 16 for quicker access.

The buffer management module 24 may control (i) the storage and access of data to and from the control module embedded SSM 14 and the HDA 16 and (ii) the transfer of data between the control module embedded SSM 14 and the HDA 16. This control may be independent of control signals received from the host. In other words, the hybrid storage system 10 may perform as a single storage device relative to the host and access the control module embedded SSM 14 and the HDA 16 without instructions or commands from the host indicating which one of the control module embedded SSM 14 and the HDA 16 to access.

For example, the buffer management module 24 may receive a first logical block address (LBA) for certain data from the host. The buffer management module 24 may then convert the first LBA to a second LBA associated with the control module embedded SSM 14. The buffer management module 24 may also or alternatively convert the first LBA to one of a third LBA or a physical block address (PBA) associated with the HDA 16. The second LBA may be provided to the eMMC interface module 26. The third LBA or the PBA may be provided to the disk access control module 28. Selection of the control module embedded SSM 14 and HDA 16 and storage, access and transfer of data to and from the control module embedded SSM 14 and the HDA 16 may be based on various parameters.

The parameters may include, for example: a frequency of use of the data; overall storage capacities of the control module embedded SSM 14 and the HDA 16; current remaining storage capacities of the control module embedded SSM 14 and the HDA 16; date and/or time (timestamp) of last use of the data, states of the control module embedded SSM 14 and the HDA 16; etc. The most recently accessed and most frequently accessed data may be stored in the control module embedded SSM 14 rather than in the HDA 16.

The buffer management module 24 also controls buffering of data between: the host and the control module embedded SSM 14; the host and the HDA 16; and/or the control module embedded SSM 14 and the HDA 16. The buffer management module 24 may temporarily store data received from the host, the control module embedded SSM 14 and/or the HDA 16 in the volatile memory 32. The data may be stored in the volatile memory 32 until being forwarded respectively to the host, the control module embedded SSM 14 and/or the HDA 16. The volatile memory 32 is used to prevent a bottleneck when transferring data between: the host and the control module embedded SSM 14; the host and the HDA 16, and/or the control module embedded SSM 14 and the HDA 16. The volatile memory 32 may include, for example, double-data rate (DDR) memory and/or DDR synchronous dynamic random access memory (DDR SDRAM).

The eMMC interface module 26 transfers commands, status information and data information between the buffer management module 24 and the control module embedded SSM 14. The eMMC interface module 26 is configured to transmit and receive various interface signals to and from the control module embedded SSM 14. The interface signals may be transmitted over an eMMC interface bus 36 and/or respective signal lines between the eMMC interface module 26 and the control module embedded SSM 14. The eMMC interface bus 36 may be directly connected to the eMMC interface module 26 and the control module embedded SSM 14.

The interface signals may include, for example, a clock signal, an initialization and command transfer signal, a hardware reset signal, data signals, power signals (or voltage reference or supply signals), etc. The eMMC interface module 26 may include logic to handle real time transfer of the interface signals according to an eMMC standard. The term real time refers to the actual time for a transfer process to occur with negligible delay. An example eMMC standard is the "Embedded MultiMediaCard (eMMC) Product Standard v4.41", by JEDEC Solid State Technology Association (previously know as the Joint Electron Devices Engineering Council), having publication No. JESD84-A441. The eMMC interface module 26 is described herein for non-limiting, illustrative purposes. Based on the disclosure and teachings provided herein, it should be understood that other types of interface modules that utilize communication/bus protocols having a low pin count may be used in lieu of the eMMC interface module 26—for example, an interface module that is compliant with the Universal Flash Storage (UFS) standard, other mobile storage interface standard(s) having a low pin count or other low-power serializer/deserializer (SERDES) interfaces may be used. A pin count would be considered low if it is fewer than the pin count used in connection with the Serial ATA protocol. By using the eMMC interface module 26 or other interface modules having a low pin count, cost and power reductions can be achieved.

The control module embedded SSM 14 may be a system-in-a-package (SIP) and include various modules and memory, as shown in FIG. 2. As an example, the control module embedded SSM 14 may be an eMMC with flash memory, such as NAND and/or NOR type memory. The control module embedded SSM 14 may convert the second LBA to a PBA prior to storing and/or accessing memory cells of the control module embedded SSM 14. The eMMC interface module 26 and the control module embedded SSM 14 are further described below with respect to FIG. 2.

The disk access control module 28 controls access to the HDA 16. The disk access control module 28 may convert the third LBA to a PBA prior to storing data in and/or accessing the HDA 16. The HDA 16 includes one or more circular platters (i.e. disks) 40, which have magnetic surfaces that are used to store data magnetically. Data can be stored in either a continuous media format or bit-patterned format on the disks 40.

In FIG. 2, the hybrid storage system 10 is shown illustrating an implementation of the hybrid control module 12 and the control module embedded SSM 14. The hybrid storage system 10 includes the hybrid PCB 18 and the HDA 16. The hybrid PCB 18 includes the hybrid control module 12 and the control module embedded SSM 14.

The hybrid control module 12 includes the host interface control module 22, the buffer management module 24, the eMMC interface module 26 (hereinafter "the first eMMC interface module 26"), the disk access control module 28, the processor 30 with first random access memory (RAM) 50, the volatile memory 32 and the nonvolatile memory 34. The buffer management module 24 controls the transfer of data between: the host and the control module embedded SSM 14; the host and the HDA 16; and the control module embedded SSM 14 and the HDA 16, as described above. The buffer management module 24 and/or the first eMMC interface module 26 may include and/or access data transfer software (e.g., data transfer firmware). The data transfer software may be used to control data transfer over channels between the first eMMC interface module 26 and a second eMMC interface module 52 of the control module embedded SSM 14.

The first eMMC interface module 26 may include and/or be connected to a first eMMC interface 54. The first eMMC interface 54 may include, for example, 6-12 input and output (I/O) terminals (or pins), collectively designated 56. The I/O terminals 56 may include a clock terminal, data terminals, a control terminal, a hardware reset terminal, and/or power terminals (e.g., supply and reference terminals). In one implementation, the first eMMC interface 54 includes 10 I/O terminals with a clock terminal, 8 data terminals (or bit terminals), and a control terminal. The I/O terminals 56 may be referred to collectively as an eMMC interface bus. As previously noted, other types of interface modules having a low pin count may be used in lieu of the first eMMC interface module 26; thus, based on the disclosure and teachings provided herein, other types of compatible interfaces may be used in lieu of the first eMMC interface 54.

In FIG. 2, 10 signal lines are shown between the first eMMC interface 54 and a second eMMC interface 57 of the second eMMC interface module 52. The first signal line may transfer a clock signal CLK from the hybrid control module 12 to the control module embedded SSM 14 for synchronization purposes. The clock signal CLK may be generated by a clock generation module 58 of the hybrid control module 12. The clock generation module 58 and the frequency and duty cycle of the clock signal CLK may be controlled by the processor 30. The clock signal CLK may be a double data rate clock signal. A double data rate clock signal refers to the transferring of 2 bits per data line per clock cycle. For example, when 8 data lines are included 16 bits of data or 2 bytes of data may be transferred in a single clock cycle. The other 9 signal lines 59 between the eMMC interfaces 54, 57 may include a control line and the 8 data lines. As previously noted, other interface modules having a low pin count and interfaces may be used in lieu of the first eMMC interface module 26 and the first eMMC interface 54; similarly, based on the disclosure and teachings provided herein, other compatible interface modules having a low pin count and interfaces may also be used in lieu of the second eMMC interface module 52 and the second eMMC interface 57 to ensure interface compatibility.

The speed of the eMMC interfaces 54, 57 may be approximately 100-200 megabytes per second (MB/s). As an example, the clock signal CLK may be set at a frequency of 52 megaHertz (MHz) and the speed of the eMMC interfaces 54, 57 may be 104 MB/s. As another example, the clock signal CLK may be set at a frequency of 100 MHz and the speed of the eMMC interfaces 54, 57 may be 200 MB/s. The speed may be set based on the clock signal CLK. The frequency of the clock signal CLK may be adjusted by the processor 30.

The disk access control module 28 controls access to elements of the HDA 16 including the disks 40, a spindle motor 60, a read and write head 62 (hereinafter, "head"), a voice coil motor (VCM) 64, a preamplifier device 66, etc. The disk access control module 28 includes a spindle and voice coil motor (VCM) module 68, a self-servo write (SSW) module 70, and a read and write (read/write) channel module 72.

The spindle/VCM module 68 controls rotation of the spindle motor 60. The spindle motor 60 rotates the disks 40. The disks 40 may be arranged in a stack. As an example, the buffer management module 24 may generate commands that control the speed of the spindle motor 60 and the movement of an actuator arm 74. The spindle/VCM module 68 implements the commands and generates control signals that control the speed of the spindle motor 60 and the positioning of the actuator arm 74. The spindle/VCM module 68, based on servo and/or positioning information from the processor 30 positions the head 62 over the disks 40 during read/write operations. Servo, which is stored on the disks 40, ensures that data is written to and read from correct locations on the disks 40. The SSW module 70 may write servo on the disks 40 using the head 62 prior to storing data on the disks 40.

The read/write channel module 72 controls reading from and writing to magnetic surfaces of the disks 40, as performed by the head 62. The head 62 includes a write element, such as an inductor, that generates a magnetic field and a read element, such as a magneto-resistive (MR) element, that senses the magnetic field on the disks 40. The head 62 is mounted at a distal end of an actuator arm 74. An actuator, such as the VCM 64, moves the actuator arm 74 relative to the disks 40.

The read/write channel module 72 generates access signals that are amplified by the preamplifier device 66 prior to being sent to the head 62. The preamplifier device 66 may also amplify signals received from the head 62 prior to being sent to the read/write channel module 72. The preamplifier device 66 generates a write current that flows through the write element of the head 62 when writing data. The write current is used to produce a magnetic field on the magnetic surfaces of the disks 40. Magnetic surfaces of the disks 40 induce low-level analog signals in the read element of the head 62 during reading of the disks 40. The preamplifier device 66 amplifies the low-level analog signals and outputs amplified analog signals to a read/write channel module 72. The read/write channel module 72 may transfer data at approximately 200-300 MB/s between the buffer management module 24 and the HDA 16.

During write operations, the read/write channel module 72 may encode the data to increase reliability by using error-correcting codes (ECC) such as run length limited (RLL) code, Reed-Solomon code, etc. The read/write channel module 72 then transmits the encoded data to the preamplifier device 66. During read operations, the read/write channel module 72 receives analog signals from the preamplifier device 66. The read/write channel module 72 converts the analog signals into digital signals, which are decoded to recover the original data.

The control module embedded SSM 14 includes the second eMMC interface module 52, a buffer control module 80, volatile memory 82, a SSM control module 84, and SSM 86. Each of the second eMMC interface module 52, the buffer control module 80, the volatile memory 82, and the SSM control module 84 may be a SOC. The SSM 86 may include one or more SOCs. The second eMMC interface module 52 may include or be connected to the second eMMC interface 57. The second eMMC interface 57 may include the same number and type of I/O terminals as the first eMMC interface 54.

The buffer control module 80 is connected between the second eMMC interface module 52 and the SSM control module 84. The buffer control module 80 buffers data received from the hybrid control module 12 via the second eMMC interface module 52 and from the SSM 86 via the SSM control module 84. The buffer control module 80 temporarily stores the data in the volatile memory 82 of the control module embedded SSM 14. The volatile memory 82 may include volatile memory 82, such as DDR memory and/or DDR SDRAM memory. The buffer control module 80 controls mapping of data stored in the SSM 86 including dynamic and/or static wear leveling.

Dynamic wear leveling refers to the use of a map to link LBAs from an operating system (OS) to the SSM 86. Each time the OS writes replacement data, the map is updated such that the original (or previous stored) physical block of data is marked as invalid data. A new storage area is linked to the replacement data. Each time a block of data is re-written to the SSM, the block of data may be written to a new (or different) location. Static wear leveling includes using a map to link LBAs to physical memory addresses. Static wear leveling is similar to dynamic wear leveling except that static blocks of data (rarely accessed blocks of data) that do not change are periodically moved. This allows low usage memory cells of the static blocks of data to be used for other data.

The SSM control module 84 is connected between the buffer control module 80 and the SSM 86 and may include a SSM processor 90 and second RAM 92 (or nonvolatile memory). The second RAM 92 may store software (e.g., firmware) to interface directly with the SSM 86. The SSM control module 84 may include a SSM interface 94 that is connected directly to the SSM 86. The SSM interface 94 may be, for example, a toggle interface or an open NAND flash interface (ONFI) and have, for example, approximately 50-150 I/O terminals (or pins). The number of I/O terminals may be based on the amount, type and configuration of the SSM 86 connected to the SSM control module 84. The speed of the SSM interface 94 or a portion (e.g., predetermined set of data terminals) of the SSM interface 94 may be approximately 5-20 MB/s.

The SSM control module 84 controls data transfer between the buffer control module 80 and the SSM 86. The SSM 86 may include, for example, NAND and/or NOR type memory. The SSM processor 90 may convert LBAs received from the hybrid control module 12 to PBAs for data storage and access purposes. The SSM processor 90 may process data, including encoding, decoding, filtering, and/or formatting prior to and/or subsequent to storing in the SSM 86.

A hard disk drive (HDD) is typically capable of storing a large amount of data (e.g., 1-5 terabytes (TB)). A HDD is a low cost per MB storage device. A HDD however has associated disadvantages including mechanical moving parts, slow seek times (e.g., 10 milliseconds (ms)), and a low number of input and output operations per second (IOPs). The seek times include seeking to a particular track of a disk in a stack. The number of IOPs refers to how fast target data can be accessed. Also, a HDD may have only a single I/O terminal, which limits the number of IOPs.

A solid-state drive (SSD) does not have mechanical moving parts and has a high number of IOPs relative to a HDD. The high number of IOPs is provided by having multiple parallel channels communicating during the same period with SSM. Also, memory cells of the SSM are directly accessible without seeking to a particular track, as with a HDD. A SSD however has associated disadvantages including a high cost per megabyte of storage relative to a HDD and complex firmware to control data storage and access to and from SSM. A SSD may also include an interface between a SSM control module and SSM that includes tens-hundreds of channels or signal lines. Thus, the costs of the SSD may be based on cost of the SSM, the size of the interface, and the complexity of the firmware needed to control data transfer over the interface.

The above described implementations of FIGS. 1 and 2 provide a hybrid storage drive that includes control module embedded SSM and a HDA 16. The control module embedded SSM includes eMMC interfaces, which have a reduced number of channels over that used between a SSM control module and SSM of a SSD. This reduces costs and complexity associated with, for example, a hybrid control module. The reduced number of channels is due to interfacing the hybrid control module with an eMMC interface instead of interfacing the hybrid control module directly to one or more chips of SSM.

Since the hybrid control module interfaces with an eMMC interface instead of directly with SSM, costs and complexity are reduced. Firmware of the hybrid control module that is used to interface with the eMMC interface is less complex than firmware used to interface directly with SSM due to a reduced number of channels. In the disclosed implementations, firmware associated with directly interfacing with SSM is stored on the control module embedded SSM (e.g., in the SSM control module 84).

Also, as the disclosed hybrid storage drive includes control module embedded SSM that satisfies an eMMC standard, costs of the hybrid storage drive can be reduced with high production of the control module embedded SSM. Also, with mass production of the control module embedded SSM, time to market for the hybrid storage drive is reduced. The time to market may be less than that of a hybrid storage drive with direct interfacing between a hybrid control module and SSM, where the hybrid control module includes a SSM control module.

Thus, the disclosed hybrid storage drive provides the benefits of a HDD and a SSD while providing: reduced cost per MB of storage relative to a HDD; simplified firmware used to access a package (e.g., SIP) with SSM; minimized time to market; and simplified hybrid control module architectures. These benefits are provided with minimal added cost to a SSM SOC and/or SSM SIP.

Figure 3:
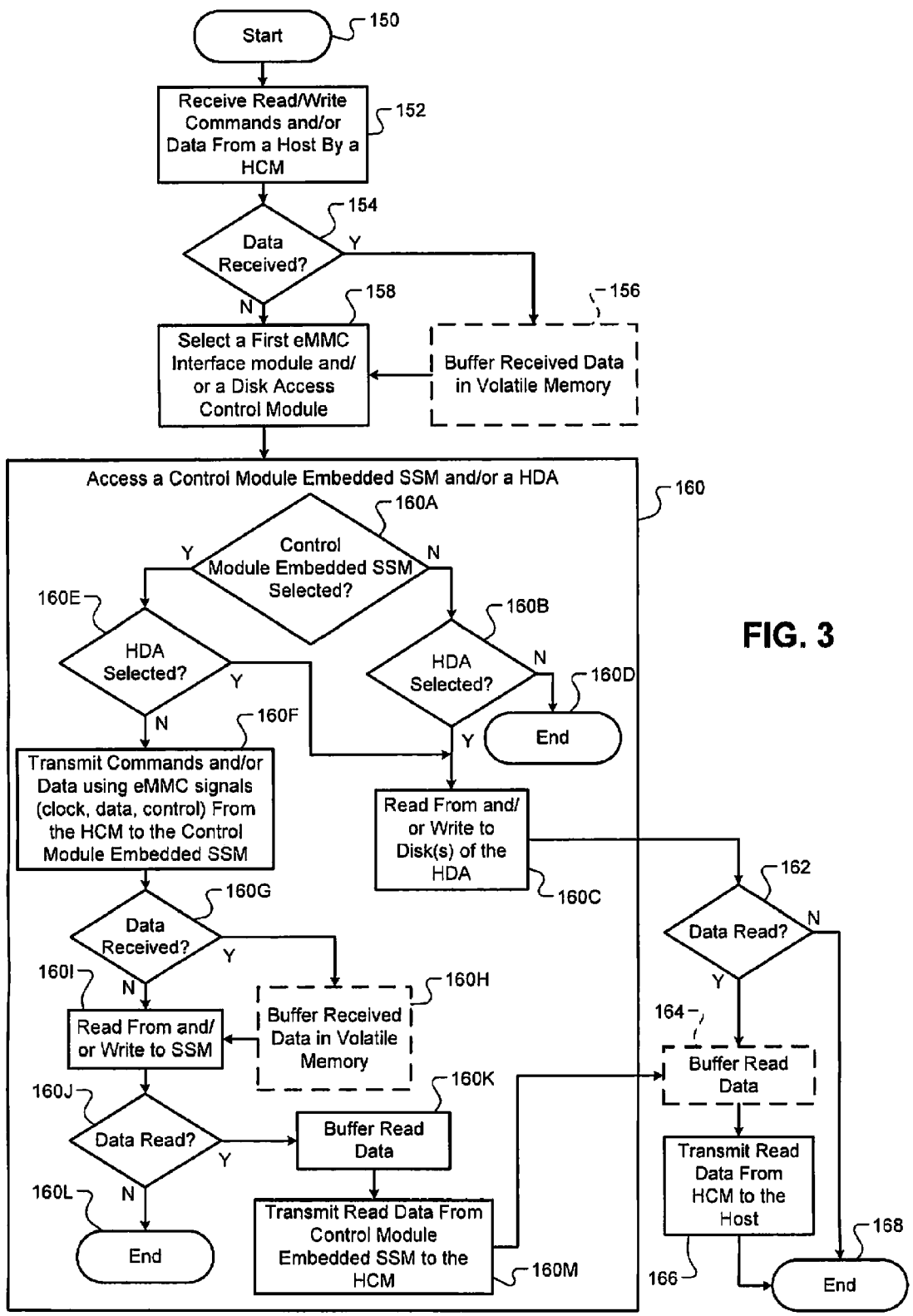
FIG. 3 illustrates a method of operating a hybrid storage system in accordance with the present disclosure.

The hybrid storage system 10 may be operated using numerous methods, an example method is provided by the method of FIG. 3. In FIG. 3, a method of operating a hybrid storage system 10 is shown. Although the following tasks are primarily described with respect to the implementations of FIGS. 1 and 2, the tasks may be easily modified to apply to other implementations of the present disclosure. The tasks may be iteratively performed. The method may begin at 150.

At 152, the hybrid control module (HCM) 12 receives read and/or write (read/write) commands and/or data from a host. At 154, the buffer management module 24 determines whether data is received. Task 156 is performed when data is received, otherwise task 158 is performed.

At 156, the buffer management module 24 may buffer the received data in the volatile memory 32. The buffer management module 24 may buffer the data, for example, when: the first eMMC interface module 26 is waiting for the second eMMC interface module 52 to accept additional data; the first eMMC interface module 26 is unable to accept additional data; a transfer rate between the host interface control module 22 and the buffer management module 24 matches or exceeds combined transfer rates between the buffer management module 24 and the first eMMC interface control module 26 and between the buffer management module 24 and the disk access control module 28; etc.

At 158, the buffer management module 24 determines whether to access the control module embedded SSM 14 and/or the HDA 16. The buffer management module 24 selects the first eMMC interface module 26 and/or the disk access control module 28 to access the control module embedded SSM 14 and/or the HDA 16.

At 160, the buffer management module 24 access the control module embedded SSM 14 and/or the HDA 16 via the first eMMC interface module 26 and/or the disk access control module 28. Tasks 160A, 160B, 160D and 160E are provided for illustration purposes only, tasks 160A, 160B, 160D and 160E may not be performed. Tasks 160C and/or 160F may be performed subsequent to and based on the determination at 158. Task 160B may be performed when the control module embedded SSM is not selected, otherwise task 160E may be performed. Task 160C may be performed when the HDA 16 is selected. Task 160F may be performed when the control module embedded SSM 14 is selected.

At 160C, the disk access control module 28 may read from and/or write to disk(s) of the HDA 16 when the HDA 16 is selected regardless of whether the control module embedded SSM is selected. Task 162 may be performed subsequent to task 160C. At 160F, various eMMC signals may be used to transmit commands and/or data from the HCM 12 to the control module embedded SSM 14 when the control module embedded SSM is selected regardless of whether the HDA 16 is selected. The eMMC signals may include the clock signal CLK, data signals, a control signal, etc. The eMMC signals may be used for command and data transfer purposes. The method may end at 160D when neither the HDA 16 nor the control module embedded SSM 14 are selected.

At 160G, the buffer control module 80 determines whether data is received by the control module embedded SSM 14 from the HCM 12. Task 160H may be performed when data is received, otherwise task 160I is performed. At 160H, the buffer control module 80 may buffer the received data in the volatile memory 82 prior to storing in the SSM 86. The buffer control module 80 may buffer the data, for example, when the buffer control module 80 is waiting for the SSM control module 84 to accept additional data. The SSM control module 84 may not be able to accept additional data, for example, when a data transfer rate between the buffer control module 80 and the SSM control module 84 has matched or exceeded a data transfer rate between the SSM control module 84 and the SSM 86.

At 160I, the SSM control module 80 reads from and/or write to the SSM 86. The SSM control module 84 may read from and/or write to the SSM 86 based on the control signal received from the HCM 12.

At 160J, the buffer control module 80 may determine if data has been read from the SSM 86. Task 160K may be performed when data has been read from the SSM 86, otherwise the method may end at 160L.

At 160K, the buffer control module 80 may buffer the read data from the SSM 86 in the volatile memory 82. The buffer control module 80 may buffer the read data when, for example, a transfer rate between the SSM control module 84 matches and/or exceeds a transfer rate between the buffer control module 80 and the second eMMC interface module 52. At 160M, the read data is transmitted to the HCM 12 from the control module embedded SSM 14 via the interfaces 54, 57.

At 162, the buffer management module 24 may determine whether data has been read from the HDA 16. Task 164 may be performed when data has been read from the HDA 16, otherwise task 168 may be performed.

At 164, data read from the HDA 16 and/or from the SSM 86 may be buffered in the volatile memory 32. This may occur when the combined transfer rates between the first eMMC interface module 26 and the buffer management module 24 and between the disk access control module 28 and the buffer management module 24 matches or exceeds a transfer rate between the buffer management module 24 and the host interface control module 22.

At 166, the host interface control module 22 transmits read data from the buffer management module 24 to the host via the host interface 20. Task 152 may be performed subsequent to tasks 162, 166 or the method may end at 168, as shown.

The above-described tasks are meant to be illustrative examples; the tasks may be performed sequentially, synchronously, simultaneously, continuously, during overlapping time periods or in a different order depending upon the application.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A hybrid circuit comprising:
a system-in-a-package comprising
a first solid-state memory, and
a first control module configured to control access to the first solid-state memory based on a first control signal; and
a first integrated circuit separate from the system-in-a-package, wherein the first integrated circuit comprises
a first embedded multi-media card module in communication with the system-in-a-package according to an embedded multi-media card standard, wherein the first embedded multi-media card module is configured to transfer the first control signal to the first control module to access the first solid-state memory,
a second control module configured to control access to a magnetic storage device based on a second control signal, and
a management module configured to control both the first embedded multi-media card module and the magnetic storage device including (i) generating the first control signal to transfer first data between a host and the system-in-a-package via the first embedded multi-media card module, and (ii) generating the second control signal to transfer the first data or second data between the host and the magnetic storage device via the second control module, wherein the host is separate from the first integrated circuit and the system-in-a package.

2. The hybrid circuit of claim 1, further comprising:
a second integrated circuit comprising the first solid-state memory; and
a third integrated circuit comprising the first control module.

3. The hybrid circuit of claim 1, wherein a number of channels between the first control module and the first solid-state memory is greater than a number of channels between the system-in-a-package and the first integrated circuit.

4. The hybrid circuit of claim 1, wherein:
the system-in-a-package comprises a first interface, wherein the first interface comprises a first plurality of pins, and
wherein the management module is configured to, via the first interface, transfer the first data to or receive the first data from the first control module; and
the first integrated circuit comprises a second interface, wherein the second interface comprises a second plurality of pins,
wherein the first control module is configured to, via the second interface, transfer the first data to or receive the first data from the first solid-state memory, and
wherein the first plurality of pins includes fewer pins than the second plurality of pins.

5. The hybrid circuit of claim 1, wherein a number of pins connecting the system-in-a-package to the first integrated circuit is less than a number of pins connecting the first solid-state memory to the first control module.

6. The hybrid circuit of claim 1, wherein:
the system-in-a-package comprises a plurality of solid-state memories;
the plurality of solid-state memories comprise the first solid-state memory; and
the first control module is connected to and controls access to the plurality of solid-state memories.

7. The hybrid circuit of claim 1, wherein:
the first integrated circuit comprises input and output terminals; and
the input and output terminals include a clock terminal, eight data bit terminals, and a control terminal.

8. The hybrid circuit of claim 1, wherein:
the system-in-a-package comprises a plurality of solid-state memories;
the plurality of solid-state memories comprise the first solid-state memory;
the first integrated circuit is connected to the system-in-a-package via 10 input and output terminals; and
the first control module is connected to the plurality of solid-state memories via a 50-150 input and output terminals.

9. The hybrid circuit of claim 1, wherein:
the first integrated circuit comprises a clock generation module;
the clock generation module is configured to generate a clock signal; and
the first embedded multi-media card module is configured to (i) transmit the clock signal to the system-in-a-package, and (ii) based on the clock signal, transfer the first data to or receive the first data from the system-in-a-package.

10. The hybrid circuit of claim 9, wherein:
the first integrated circuit comprises a plurality of terminals;
the clock signal is a double data rate clock signal; and
the first embedded multi-media card module is configured to transfer two bits of data per clock cycle of the clock signal between (i) each of the plurality of terminals of the first integrated circuit and (ii) the system-in-a-package.

11. The hybrid circuit of claim 1, wherein the second control module comprises:
a motor control module configured to control (i) rotation of a magnetic medium, and (ii) position of a read and write head; and
a channel module configured to transfer the first data or the second data between the management module and a disk.

12. The hybrid circuit of claim 1, wherein the management module is configured to:
store the first data or the second data, received from the host, in a volatile memory prior to forwarding the first data or the second data to the first embedded multi-media card module or the second control module;
determine whether the first data or the second data is to be stored in the first solid-state memory or in the magnetic storage device; and
based on the determination, forward the first data or the second data, received from the volatile memory, to the first embedded multi-media card module or the second control module.

13. The hybrid circuit of claim 1, wherein the management module is configured to:
determine whether the first data or the second data is to be read from the first solid-state memory or the magnetic storage device;
based on the determination, either (i) forward a portion of the first data or the second data from the first embedded multi-media card module to a volatile memory, or (ii) forward a portion of the first data or the second data from the second control module to the volatile memory; and
store the first data or the second data, received from the first embedded multi-media card module or the second control module, in the volatile memory prior to forwarding the first data or the second data to the host.

14. A hybrid storage drive comprising:
the hybrid circuit of claim 1; and
a hard drive assembly in communication with the hybrid circuit, wherein the hard drive assembly comprises the magnetic storage device.

15. The hybrid storage drive of claim 14, wherein the system-in-a-package comprises:
a second embedded multi-media card module configured to transfer the first data to or receive the first data from the first embedded multi-media card module;
a buffer module configured to (i) buffer the first data, and (ii) transfer the first data between the second embedded multi-media card module and the first control module, wherein the first control module is configured to transfer the first data between the buffer module and the first solid-state memory; and
the first solid-state memory.

16. A method of transferring data between a host and a hybrid circuit, wherein the hybrid circuit comprises a system-in-a-package and a first integrated circuit, wherein the first integrated circuit is separate from the system-in-a-package, wherein the system-in-a-package comprises a first solid-state memory and a first control module, wherein the first integrated circuit comprises an embedded multi-media card module, a second control module and a management module, and wherein the host is separate from the first integrated circuit and the system-in-a package the method comprising:

via the management module, controlling both the first embedded multi-media card module and a magnetic storage device including
generating a first control signal to transfer first data between the host and the system-in-a-package via the embedded multi-media card module,
generating a second control signal to transfer the first data or second data between the host and the magnetic storage device via the second control module;
communicating with the system-in-a-package via the embedded multi-media card module and according to an embedded multi-media card standard including transferring the first control signal to the first control module to access the first solid-state memory;
based on the first control signal, controlling access to the first solid-state memory via the first control module; and
based on the second control signal, controlling access to the magnetic storage device via the second control module.

17. The method of claim 16, further comprising:
via a first interface, (i) transferring the first data from the management module to the first control module, or (ii) receiving the first data from the first control module at the management module, wherein the system-in-a-package comprises the first interface, wherein the first interface comprises a first plurality of pins; and
via a second interface, (i) transferring the first data from the first control module to the solid-state memory or (ii) receiving the first data from the solid-state memory at the first control module, wherein the first integrated circuit comprises the second interface, wherein the second interface comprises a second plurality of pins, and wherein the first plurality of pins includes fewer pins than the second plurality of pins.

18. The method of claim 16, further comprising:
generating a clock signal at the first integrated circuit; and
transmitting the clock signal from the embedded multi-media card module to the system-in-a-package; and
based on the clock signal, (i) transferring the first data from the embedded multi-media card module to the system-in-a-package, or (ii) receiving the first data from the system-in-a-package at the embedded multi-media card module.

19. The method of claim 16, further comprising, via the management module:
storing the first data or the second data, received from the host, in a volatile memory prior to forwarding the first data or the second data to the embedded multi-media card module or the second control module;
determining whether the first data or the second data is to be stored in the first solid-state memory or in the magnetic storage device; and
based on the determination, forwarding the first data or the second data, received from the volatile memory, to the embedded multi-media card module or the second control module.

20. The method of claim 16, further comprising, via the management module:
determining whether the first data or the second data is to be read from the first solid-state memory or the magnetic storage device;
based on the determination, either (i) forwarding a portion of the first data or the second data from the embedded multi-media card module to a volatile memory, or (ii) forwarding a portion of the first data or the second data from the second control module to the volatile memory; and
storing the first data or the second data, received from the embedded multi-media card module or the second control module, in the volatile memory prior to forwarding the first data or the second data to the host.

* * * * *